A. WIRSCHING & F. MILLER.
Photographic Camera.
No. 24,356. Patented June 7, 1859.
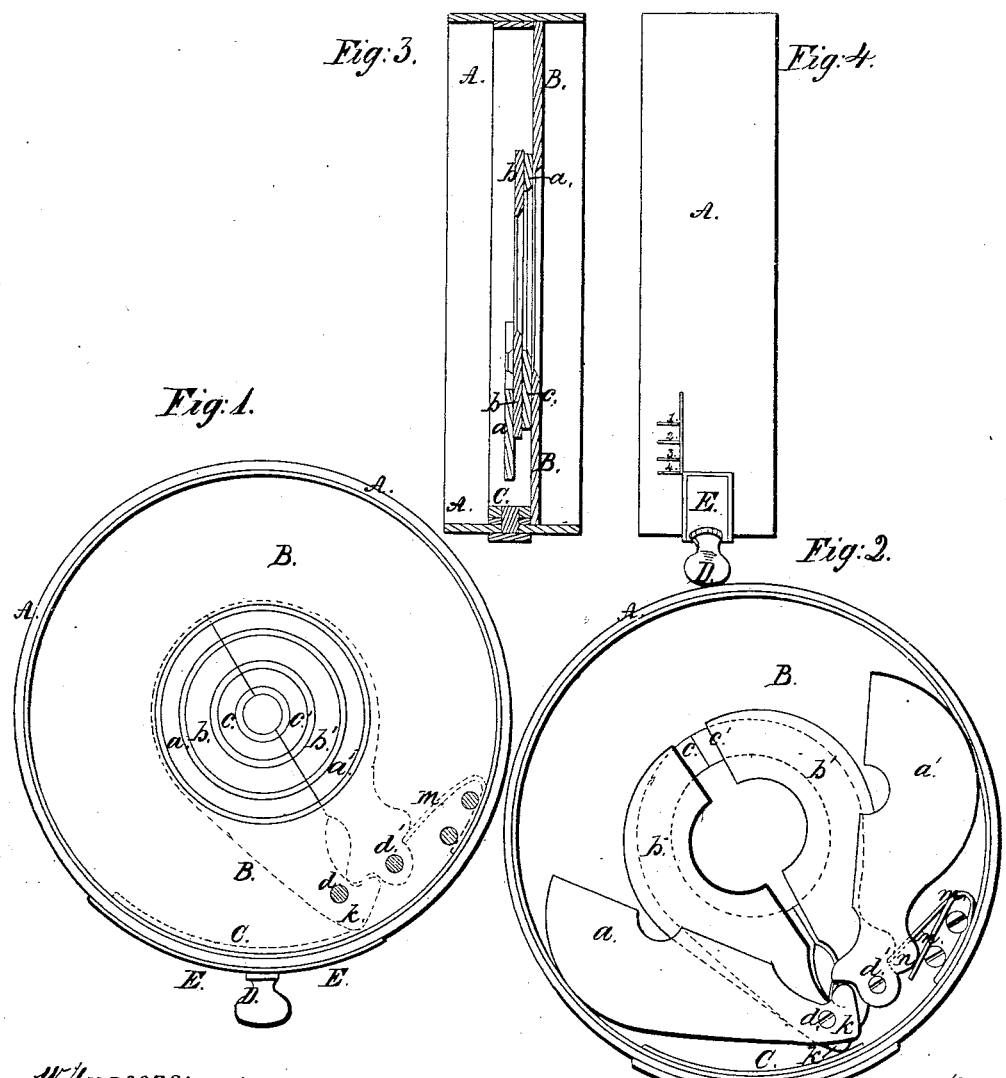

UNITED STATES PATENT OFFICE.

FELIX MILLER AND ALOIS WIRSCHING, OF NEW YORK, N. Y., ASSIGNORS TO FELIX MILLER AND H. H. HAYDEN, OF SAME PLACE.

DIAPHRAGM FOR PHOTOGRAPHIC CAMERAS.

Specification of Letters Patent No. 24,356, dated June 7, 1859.

*To all whom it may concern:*

Be it known that we, FELIX MILLER and ALOIS WIRSCHING, both of the city, county, and State of New York, have invented a new and useful Improvement in Adjusting Diaphragms for Photographic Cameras; and we do hereby declare that the following is a full, clear, and exact description of the same, reference being had to the accompanying drawings and to the letters of reference marked thereon.

Our invention relates to the manner of operating a number of curved plates placed within a tube in front of the lens, so as to form apertures of different sizes for increasing or diminishing the intensity or sharpness of light into the camera from the object in taking photographic pictures, described, represented and specified as follows:—

Figure 1, is an end view of the tube looking into the camera. Fig. 2, is the opposite view of that part of the tube which contains the adjustable plates. Fig. 3, is vertical section of the same. Fig. 4, shows a side view of the same with the index for determining the size of the aperture, all being detached from the main tube of the camera. Fig. 5, is a view of the notched slide for operating the plates C.

A, is a portion of the tube which contains the lens. This tube is made as is common in most cases and within the tube is placed the disk or diaphragm B, having an opening as large as the diaphragm is expected to make.

$a$, $b$, $c$, are thin plates, which may be made of any suitable material such as india-rubber, ebony wood, etc. These plates $a$, $b$, $c$, and $a'$, $b'$, $c'$, are pivoted respectively at $d$, $d'$, to the diaphragm plate B, and are shaped as shown in the drawings with circular apertures, which vary in size and which are concentric with the center of the opening in the diaphragm B, when brought together as shown clearly in Fig. 1, they being made in halves as shown in the drawings Figs. 1 and 2.

C, is a slide fitting to the inside of the tube and is operated by a small knob D, passing through the side of the tube and through a plate E. This latter plate prevents the admission of light through the slot in the tube and also serves as an index to adjust the diaphragm plates and to indicate the size of the aperture, by comparing it with the index marks on the outside of the tube, as shown in Fig. 4.

The inner plate or slide C, (shown in Fig. 5) has notches cut in its end which, when the slide is moved forward, operate the plates so as to open them in the order of the letters $a$, $a'$, $b$, $b'$, $c$, $c'$. The plates $a$, $b$, $c$, and $a'$, $b'$, $c'$, lie one upon the other, the smallest aperture being in the top plates, the end $i$, of the slide comes in contact with the projecting portion $k$ of the upper plate $a$, and forces the plate open against the flange or rim of the tube A, as indicated by Fig. 2. This opens the opposite section of the plate $a'$, and the larger opening of the next layer of plates $b$, $b'$, is obtained. The slide is then pressed farther forward and the notch $i'$, opens these plates in the same manner as described in the first operation, and the still larger opening of plates $c$, $c'$, is obtained. These plates are opened precisely in the same manner exposing the largest opening, that of the diaphragm. When the slide is drawn back again the springs $m$, return the plates again to the positions shown by Fig. 1. These springs, three in number press against the shoulders $n$, of each of the plates $a'$, $b'$, $c'$, and keep all the plates together except when operated upon by the slide C. These plates can be readily removed from the instrument and others substituted in their place, and the expense for constructing such an instrument is comparatively trifling while the parts are readily and accurately adjusted and the relative adjustment indicated on the outside of the tube.

What we claim as new and desire to secure by Letters Patent, is,

The arrangement and combination of the plates ($a$, $a'$,) the notched plate C, and springs ($m$) as and for the purpose herein shown and described.

FELIX MILLER.
ALOIS WIRSCHING.

Witnesses:
M. HUGHES,
M. M. LIVINGSTON.